(12) United States Patent
Liang et al.

(10) Patent No.: US 9,740,776 B2
(45) Date of Patent: Aug. 22, 2017

(54) METHOD FOR EXTRACTING RESIDUAL VIDEOS AND DELETED VIDEOS IN A DVR HARD DISK

(71) Applicant: XLY SALVATIONDATA TECHNOLOGY INC., Chengdu, Sichuan (CN)

(72) Inventors: Xiaoning Liang, Neijiang (CN); Chaoming Xu, Neijiang (CN)

(73) Assignee: XLY SALVATIONDATA TECHNOLOGY, INC., Chengdu (CN)

( * ) Notice: Subject to any disclaimer, the term of this patent is extended or adjusted under 35 U.S.C. 154(b) by 0 days.

(21) Appl. No.: 15/315,927

(22) PCT Filed: Aug. 3, 2015

(86) PCT No.: PCT/CN2015/083392
§ 371 (c)(1),
(2) Date: Dec. 2, 2016

(87) PCT Pub. No.: WO2015/185022
PCT Pub. Date: Dec. 10, 2015

(65) Prior Publication Data
US 2017/0109440 A1   Apr. 20, 2017

(51) Int. Cl.
| | | |
|---|---|---|
| H04N 5/765 | (2006.01) | |
| H04N 5/89 | (2006.01) | |
| G06F 17/30 | (2006.01) | |
| G06F 3/06 | (2006.01) | |

(52) U.S. Cl.
CPC ...... *G06F 17/30817* (2013.01); *G06F 3/0619* (2013.01); *G06F 3/0643* (2013.01); *G06F 3/0674* (2013.01); *G06F 17/30115* (2013.01); *G06F 17/30129* (2013.01)

(58) Field of Classification Search
CPC ...................................................... G06F 11/14
USPC ........ 386/200, 248, 323, 326, 332, 334, 336
See application file for complete search history.

(56) References Cited

U.S. PATENT DOCUMENTS

2007/0088674 A1* 4/2007 Kawate ............. G06F 17/30858

FOREIGN PATENT DOCUMENTS

| CN | 201402458 Y | 2/2010 |
|---|---|---|
| CN | 102253868 A | 11/2011 |
| CN | 103473147 A | 12/2013 |

OTHER PUBLICATIONS

Oct. 9, 2016 Office Action issued in Chinese Application No. 201410240228.8.

* cited by examiner

*Primary Examiner* — Robert Chevalier
(74) *Attorney, Agent, or Firm* — Oliff PLC

(57) ABSTRACT

A method for extracting residual videos in a DVR hard disk and deleted videos, including: 1) connecting and recognizing devices; 2) judging whether a file system can be recognized; 3) if so, parsing disk partitions and matching the file system; 4) scanning sectors one by one; 5) parsing video data, capturing and recording same; 6) enumerating a video list and displaying same; and 7) extracting videos. Parsing and data extraction can be conducted on all DVR hard disks of various types of various manufacturers, and files in the hard disks can be reorganized into valid, single-channel and continuously played video files; and useful video data can be parsed and screened out, thereby reducing human and material resources.

4 Claims, 2 Drawing Sheets

METHOD FOR EXTRACTING RESIDUAL VIDEOS AND DELETED VIDEOS IN A DVR HARD DISK

FIELD OF THE INVENTION

The invention relates generally to information security technologies and in particular to a method for extracting residual videos and deleted videos in a DVR hard disk and also a method based on the apparatus.

BACKGROUND OF THE INVENTION

Digital Video Recorders (DVRs) that store video data in their hard disks have already replaced analog video recorders. DVRs include PC-DVRs based on PC architecture and embedded DVRs independent from PC architecture. It is a computer system that can independently store and process images with functions of long-time video recording, audio recording, and remote monitoring and controlling over images and voice. However, the deletion and overwrite of videos for various reasons may easily cause data loss.

Residual and deleted videos can not be extracted presently and the extraction of data stored in a DVR hard disk may suffer incompatibility as different vendors and various types of hard disks have different video stream headers.

SUMMARY OF THE INVENTION

With a view of defects of the related art, the present invention provides a method for extracting residual videos and deleted videos to effectively solve the problems of the related art.

A method for extracting residual videos and deleted videos in a DVR hard disk, comprising the steps of:
1) Connecting the DVR hard disk and the storage hard disk to the main system processor via the high-speed SATA interface and an interface respectively to recognize the connected devices;
2) The main system processor automatically parsing a file system in DVR hard disk to judge whether the file system can be recognized;
3) If it can be recognized, starting to parse the disk partition and matching the file system to select the corresponding disk where residual videos or deleted videos are to be selected for extraction;
4) If the residual videos are to be extracted, parsing clusters in the DVR hard disk one by one to find the free area beyond the overwritten area, wherein the residual videos stored in the sectors will be parsed on their stream header information; if the deleted videos are to be extracted, parsing sectors one by one to find the sectors identified with delete tag, wherein the videos will be parsed on their stream header information;
5) Comparing video files with respect to their time period and channel number based on the specific tags of their video stream header information, wherein if the video files have the same channel number and the same time period with each other, the parsing will go to the next sector with a specific tag; however if the channel number is not the same or the time period exceeds the specified range, the video data of last parsed sector shall be captured and recorded;
6) Enumerating a list of all the captured and recorded video files which shall be displayed at the same time;
7) If desired, extracting all video files or filtering to extract video files according to their time period and channel number, which may be converted to ordinary video files workable on PC and imported to the storage hard disk.

Preferably, if auto-parsing a file system as described in Step 2 is unavailable, manually selecting the DVR Vendors to match the file system and going to the next step.

Preferably, if failing to obtain valid video data by executing Step 4 and 5, creating the images for all the data in the hard disk.

Preferably, repeatedly executing Step 5 until the hard disk is fully scanned and going to the next step.

Compared to the related art, the present invention has the advantage that various types of DVR hard disks made by different vendors can be parsed and extracted, wherein files can be reorganized into valid, single-channeled and continuously played video files and useful video data can be parsed and screened out, thereby reducing human and material resources. This technology has primacy and inventive step, which fills a gap in the field. Due to its rapidness, efficiency and usefulness, this invention boasts a quite high technical value with a wide use prospect and a significant social value because of its broad use range for more objects.

DETAILED DESCRIPTION OF THE PREFERRED EMBODIMENTS

Figure 1:
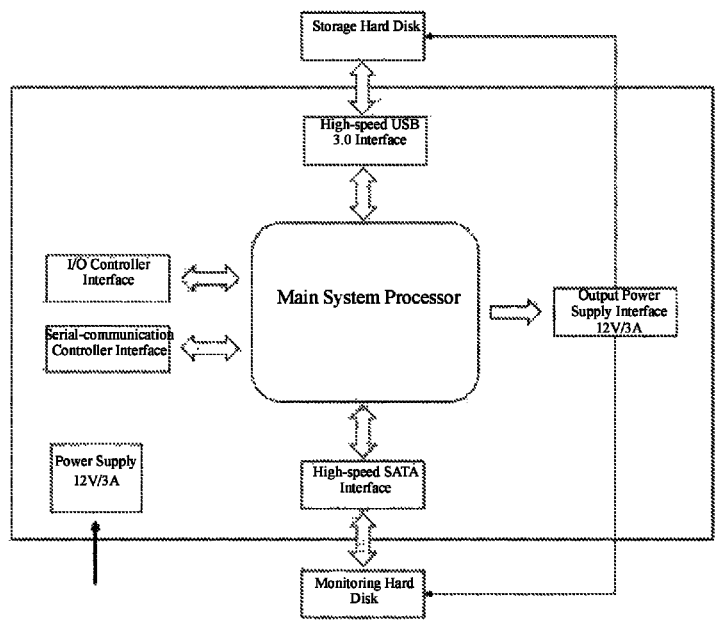
FIG. 1 is a structural diagram illustrating the apparatus used in the embodiment according to the present invention.

As shown in FIG. 1, the present invention provides an apparatus for extracting residual videos and deleted videos in a DVR hard disk, comprising a DVR hard disk, a storage hard disk, a displaying device, a control device and a main system processor, wherein said main system processor for analyzing and extracting video data is provided in it with a power supply and an I/O controller interface for connecting the control device and the displaying device and on its surface with a serial-communication controller interface, an output power supply interface, a high-speed USB 3.0 interface and a high-speed SATA interface, said main system processor is connected to the storage hard disk via the high-speed USB 3.0 interface and to the DVR hard disk via the high-speed SATA interface, wherein said output power supply interface is connected both to the storage hard disk and the DVR hard disk.

Figure 2:
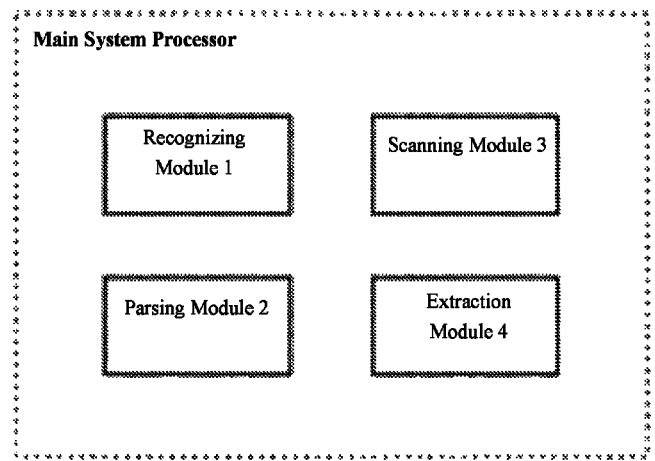
FIG. 2 is a schematic diagram of the main system processor in the present invention.

As shown in FIG. 2, said main system processor comprises a recognizing module 1 for recognizing DVR hard disk, a parsing module 2 for parsing disk partition, a scanning module 3 for scanning and enumerating video files, and an extracting module 4 for extracting video files, wherein all the said modules are coordinated and connected to one another.

Said serial-communication controller interface comprises a USB interface, a SD card, a SDHC card, a MMC card, a SM card, a memory stick, and a xD card, etc. Said displaying device is a touch-panel display, and said control device comprises a mouse and a keyboard.

Figure 3:
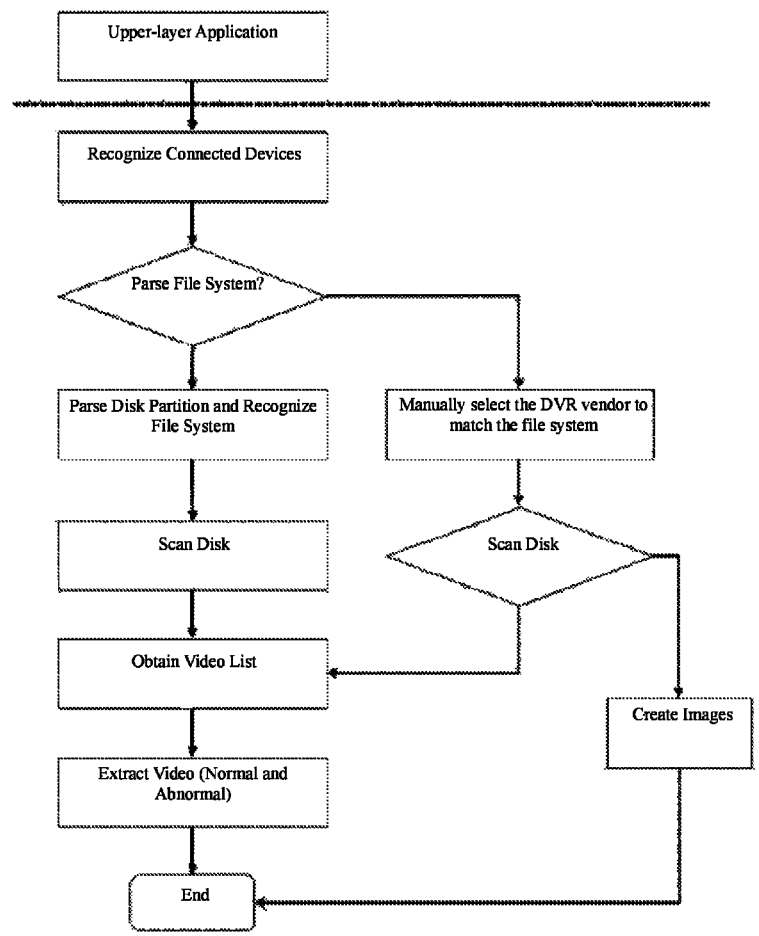
FIG. 3 is a flow chart of the embodiment according to the present invention.

As shown in FIG. 3, the present invention provides a method for extracting residual videos and deleted videos in a DVR hard disk, comprising the steps of:

1) Connecting the DVR hard disk and the storage hard disk to the main system processor via the high-speed SATA interface and the USB interface respectively to recognize the connected devices, wherein said storage hard disk can be any type of storage devices including U disks, SD cards, mobile HDDs, PC hard disks, etc.,
2) The main system processor automatically parsing a file system in DVR hard disk to judge whether the file system can be recognized for various types of DVR hard disks made by different vendors s;
3) If it can be recognized, starting to parse the disk partition and matching the file system to select the corresponding disk where residual videos or deleted videos are to be selected for extraction;
4) If the residual videos are to be extracted, parsing clusters in the DVR hard disk one by one to find the free area beyond the overwritten area, wherein the residual videos stored in the sectors will be parsed on their stream header information; if the deleted videos are to be extracted, parsing sectors one by one to find the sectors identified with delete tag, wherein the videos will be parsed on their stream header information;
5) Comparing video files with respect to their time period and channel number based on the specific tags of their video stream header information, wherein if the video files have the same channel number and the same time period with each other, the parsing will go to the next sector with a specific tag; however if the channel number is not the same or the time period exceeds the specified range, the video data of last parsed sector shall be captured and recorded;
6) Enumerating a list of all the captured and recorded video files which shall be displayed at the display at the same time;
7) If desired, extracting all video files or filtering to extract video files according to their time period and channel number, which may be converted to ordinary video files workable on PC and imported to the storage hard disk.

If auto-parsing a file system as described in Step 2 is unavailable, manually selecting the DVR vendors to match the file system and going to the next step.

If failing to obtain valid video data by executing Step 4 and 5, creating the images for all the data in the hard disk to look for another solution.

Repeatedly executing Step 5 until the hard disk is fully scanned and going to the next step.

The method can be embodied in practice that the extracting device using the method is brought to the position where videos are to be extracted. Data retrievers disassemble the hard disk of the monitoring host at the video accessing point and connect the monitoring hard disk and the target data disk to the extracting device via an interface or a hard disk slot. Then extraction proceeds with the device till the operation is complete.

The forgoing embodiment is considered to be illustrative in details to help fully understand the present invention and not restrictive. It will be evident to those skilled in the art that the present invention is not limited to the details of the foregoing illustrated embodiments and that the present invention may be embodied in other specific forms without departing from the spirit or essential attributes thereof.

The invention claimed is:

1. A method for extracting residual videos and deleted videos in a DVR hard disk, characterized in that comprising the steps of:
   1)、 Connecting the DVR hard disk and the storage hard disk to the main system processor via the high-speed SATA interface and an interface respectively to recognize the connected devices;
   2)、 The main system processor automatically parsing a file system in DVR hard disk to judge whether the file system can be recognized;
   3)、 If it can be recognized, starting to parse the disk partition and matching the file system to select the corresponding disk where residual videos or deleted videos are to be selected for extraction;
   If the residual videos are to be extracted, parsing clusters in the DVR hard disk one by one to find the free area beyond the overwritten area, wherein the residual videos stored in the sectors will be parsed on their stream header information; if the deleted videos are to be extracted, parsing sectors one by one to find the sectors identified with delete tag, wherein the videos will be parsed on their stream header information;
   Comparing video files with respect to their time period and channel number based on the specific tags of their video stream header information, wherein if the video files have the same channel number and the same time period with each other, the parsing will go to the next sector with a specific tag; however, if the channel number is not the same or the time period exceeds the specified range, the video data of last parsed sector shall be captured and recorded;
   4)、 Enumerating a list of all the captured and recorded video files which shall be displayed at the same time;
   5)、 If desired, extracting all video files or filtering to extract video files according to their time period and channel number, which may be converted to ordinary video files workable on PC and imported to the storage hard disk.

2. A method for extracting residual videos and deleted videos in a DVR hard disk according to claim 1, wherein if auto-parsing a file system as described in Step 2 is unavailable, manually select the DVR vendors to match the file system and going to the next step.

3. A method for extracting residual videos and deleted videos in a DVR hard disk according to claim 1, wherein if failing to obtain valid video data by executing Step 4 and 5, create the images for all the data in the hard disk.

4. A method for extracting residual videos and deleted videos in a DVR hard disk according to claim 1, wherein Step 5 is repeatedly executed until the hard disk is fully scanned and going to the next step.

* * * * *